US007548040B2

(12) United States Patent
Lee et al.

(10) Patent No.: US 7,548,040 B2
(45) Date of Patent: Jun. 16, 2009

(54) WIRELESS BATTERY CHARGING OF ELECTRONIC DEVICES SUCH AS WIRELESS HEADSETS/HEADPHONES

(75) Inventors: Thomas H. Lee, Burlingame, CA (US); Arthur J. Collmeyer, Incline Village, NV (US); Dickson T. Wong, Burlingame, CA (US)

(73) Assignee: ZeroG Wireless, Inc., Sunnyvale, CA (US)

( * ) Notice: Subject to any disclaimer, the term of this patent is extended or adjusted under 35 U.S.C. 154(b) by 196 days.

(21) Appl. No.: 11/494,874

(22) Filed: Jul. 28, 2006

(65) Prior Publication Data

US 2007/0032274 A1 Feb. 8, 2007

Related U.S. Application Data

(60) Provisional application No. 60/703,080, filed on Jul. 28, 2005.

(51) Int. Cl.
*H02J 7/00* (2006.01)

(52) U.S. Cl. ........................ 320/108; 320/114; 320/115

(58) Field of Classification Search .................. 320/108
See application file for complete search history.

(56) References Cited

U.S. PATENT DOCUMENTS

| | | | | |
|---|---|---|---|---|
| 4,031,449 | A | 6/1977 | Trombly | |
| 5,323,099 | A | 6/1994 | Bruni et al. | |
| 5,568,036 | A | 10/1996 | Hulsey et al. | |
| 5,959,433 | A | 9/1999 | Rohde | |
| 6,016,046 | A | 1/2000 | Kaite et al. | |
| 6,215,981 | B1 | 4/2001 | Borchardt et al. | |
| 6,633,155 | B1 | 10/2003 | Liang | |
| 7,042,196 | B2 | 5/2006 | Ka-Lai et al. | |
| 2003/0050011 | A1* | 3/2003 | Palermo et al. | 455/41 |
| 2005/0017677 | A1* | 1/2005 | Burton et al. | 320/108 |
| 2006/0058076 | A1 | 3/2006 | Mickle et al. | |
| 2006/0061323 | A1 | 3/2006 | Cheng et al. | |
| 2006/0061324 | A1 | 3/2006 | Oglesbee | |
| 2006/0061325 | A1 | 3/2006 | Tang et al. | |
| 2006/0061326 | A1 | 3/2006 | Vine et al. | |
| 2006/0063568 | A1 | 3/2006 | Mickle et al. | |
| 2006/0071632 | A1 | 4/2006 | Ghabra et al. | |
| 2006/0076922 | A1 | 4/2006 | Cheng et al. | |

OTHER PUBLICATIONS

"RCA 900MHz Wireless Headphones WHP170/WHP175," Product Manual, 44 pages, 2004, http://accessories.rca.com/rcaaccessories/productdownloads/whp175_ib.pdf.

(Continued)

*Primary Examiner*—Edward Tso
*Assistant Examiner*—Alexis Boateng
(74) *Attorney, Agent, or Firm*—Brinks Hofer Gilson & Lione

(57) ABSTRACT

This disclosure relates to wireless battery charging of electronic devices such as wireless headsets/headphones. In one embodiment, an electronic device is provided comprising a speaker comprising a coil, and the coil is operative both to cause the speaker to produce sound and to receive energy transferred to the coil via inductive coupling. The received energy is used to recharge a rechargeable battery in the electronic device. In other embodiments, the coil used to receive the energy that recharges the battery is received by a coil other than the coil in the speaker.

18 Claims, 24 Drawing Sheets

OTHER PUBLICATIONS

"RCA 900MHz Wireless Stereo Headphones with Induction Charging and Auto-Tuning, WHP175," 1 page, printed Jul. 24, 2006, http://accessories.rca.com/en-US/modeldetail.html?maincat=Wireless+Solutions&subcat=900+MHZ+Wireless+Headphones&modelnum=WHP175.
"RCA 900MHz Music and TV Headphones," 2 pages, 2006, http://www.activeandable.com/products/253.

* cited by examiner

WIRELESS BATTERY CHARGING OF ELECTRONIC DEVICES SUCH AS WIRELESS HEADSETS/HEADPHONES

CROSS-REFERENCE TO RELATED APPLICATION

This application claims the benefit of U.S. Provisional Application Ser. No. 60/703,080, filed Jul. 28, 2005, which is hereby incorporated by reference.

BACKGROUND

Portable entertainment and communication equipment have been proliferating, including devices such as cellular phones, portable DVD players, MP3 players, and portable computing devices.

In all of these examples, audio communication is a large part of the user experience. In order to increase convenience and audio quality and to provide privacy, one-way headphones or two-way headsets are employed.

For added convenience, wireless headphones/headsets are available. For example, Bluetooth headsets are available for telephone conversations as well as headphones for audio listening. Because the headphones/headsets are wireless, they are required to provide their own power source, typically a battery (wired headphones/headsets are powered by the base system). Many use rechargeable batteries and require a method for recharging the batteries.

Prior art battery charging methods are described below:

In FIG. 1, representing prior art, the power source 1 provides input via a conductive means 6 to a power adapter 5. The power adapter 5 provides power to the wireless headphone/headset 4 via a conductive means, typically a power cable 3. The cable is connected to the wireless headphone/headset via a mating connector pair 7, 8. The power source 1 can be an AC line source. The power adapter 5 would convert the AC line source to DC.

In FIG. 2, representing prior art, the power source 10 can be a regulated DC source, removing the need for a separate power adapter. In this case, DC power is delivered to the wireless headset/headphones 11 via a conductive means, typically a power cable 12. The cable is connected to the wireless headphone/headset via a mating connector pair 13, 14. The power source 10 can be the regulated DC output of a powered Universal Serial Bus (USB) socket.

FIG. 3, representing prior art, describes the battery charging mechanism of a wireless headset/headphone 25. Power is provided to the wireless headset/headphone 25 via a conductive means, typically a power cable 30. The cable is connected to the wireless headphone/headset 25 via a mating connector pair 31, 32. Power is input to a battery charging circuit 26 which manages the charging of the battery 27. Power is then provided to the rest of the system 28, which interfaces the transducer(s) 29 in the case of a headphone, or transducer(s) 29 and microphone 24 in the case of a headset.

FIG. 4, representing prior art, describes a wireless battery charging mechanism. The power source 40 provides input via a conductive means 41 to a power adapter 42. The power adapter 42 provides power to the electronic device 44 via wireless means, typically inductive coupling 43.

As improvements of technology become available, there is an opportunity for further reduction of size and weight of wireless headphones/headsets. Wired methods of recharging batteries in wireless headphones/headsets add size by way of the necessity of connectors and increase the risk of failure via failure of mechanical components caused by fatigue and corrosion of contact elements. Furthermore, the end user complexity is increased by a wired-based recharging procedure.

DETAILED DESCRIPTION OF THE PRESENTLY PREFERRED EMBODIMENTS

What is needed in the art is a mechanism to re-charge batteries in wireless headphones/headsets in order to minimize size and weight, maximize reliability, and improve end user experience.

The invention relates to wireless battery charging of wireless headphones/headsets. The following description is presented to enable one of ordinary skill in the art to make and use the invention and is provided in the context of a patent application and its requirements. Various modifications to the preferred embodiments will be readily apparent to those skilled in the art and generic principles herein may be applied to other embodiments. Thus, the present invention is not intended to be limited to the embodiments shown but is to be accorded the widest scope consistent with the principles and features described herein.

Figure 1:
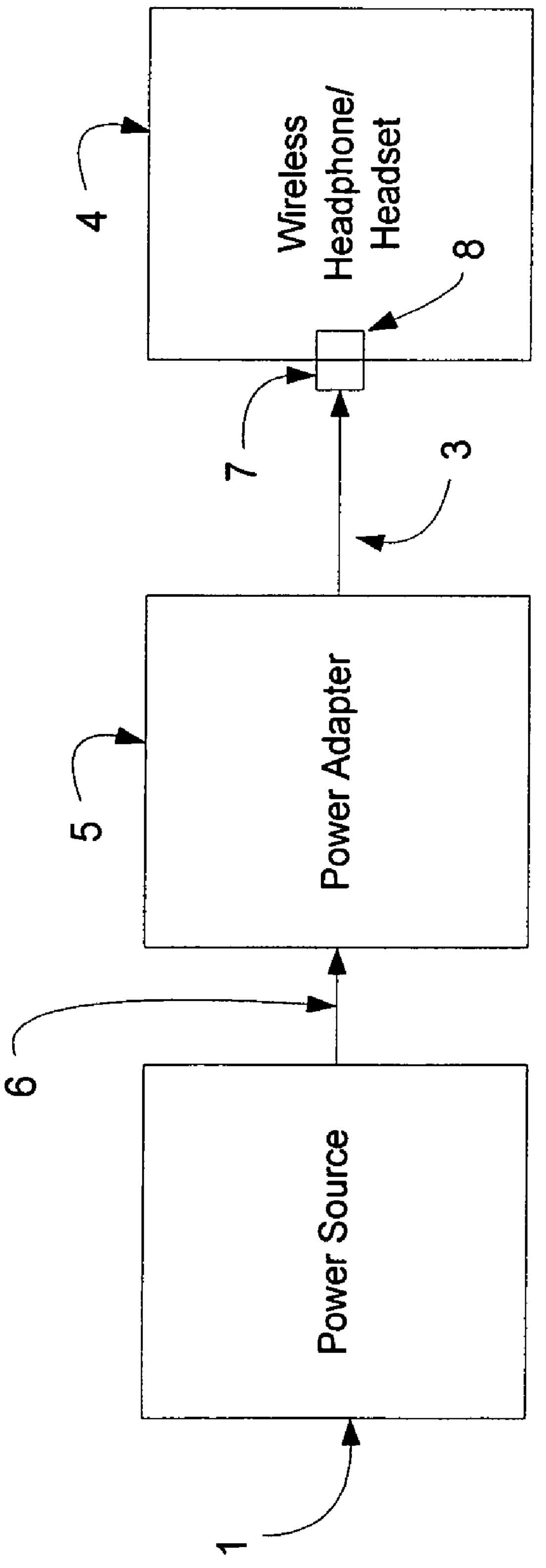
FIG. 1 (Prior Art)
FIG. 1 shows a prior art method of battery charging of a wireless headset/headphone apparatus via a wire connection.
Figure 2:
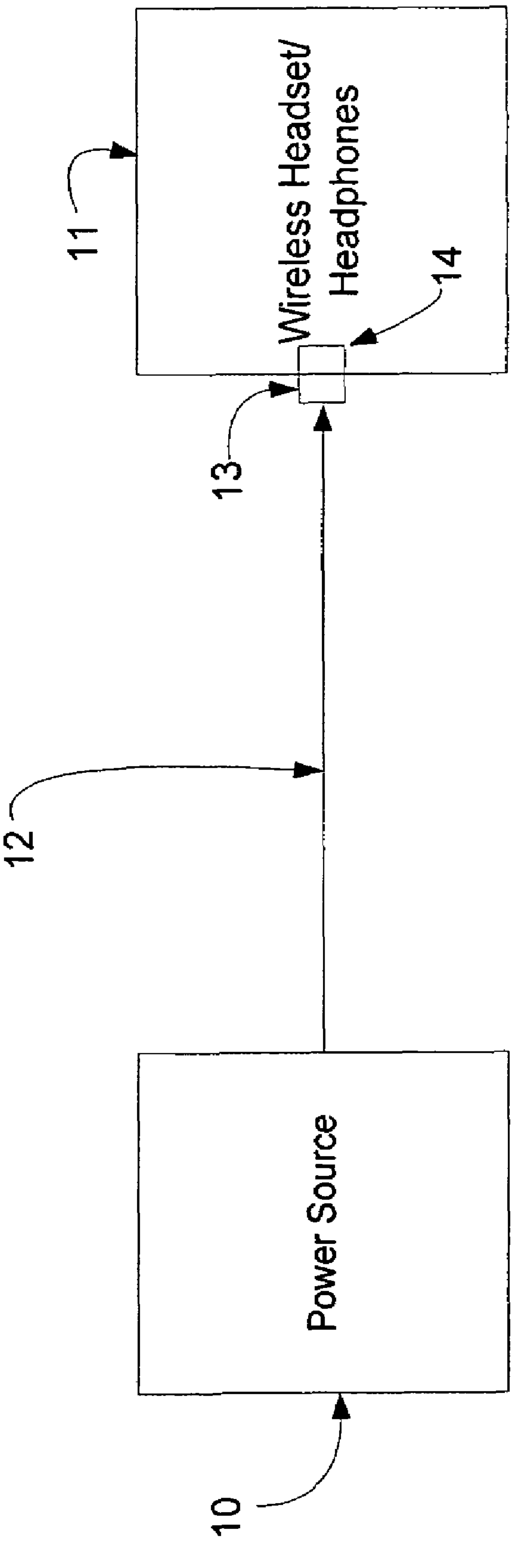
FIG. 2 (Prior Art)
FIG. 2 shows a prior art method of battery charging of a wireless headset/headphone apparatus via a wire connection.
Figure 3:
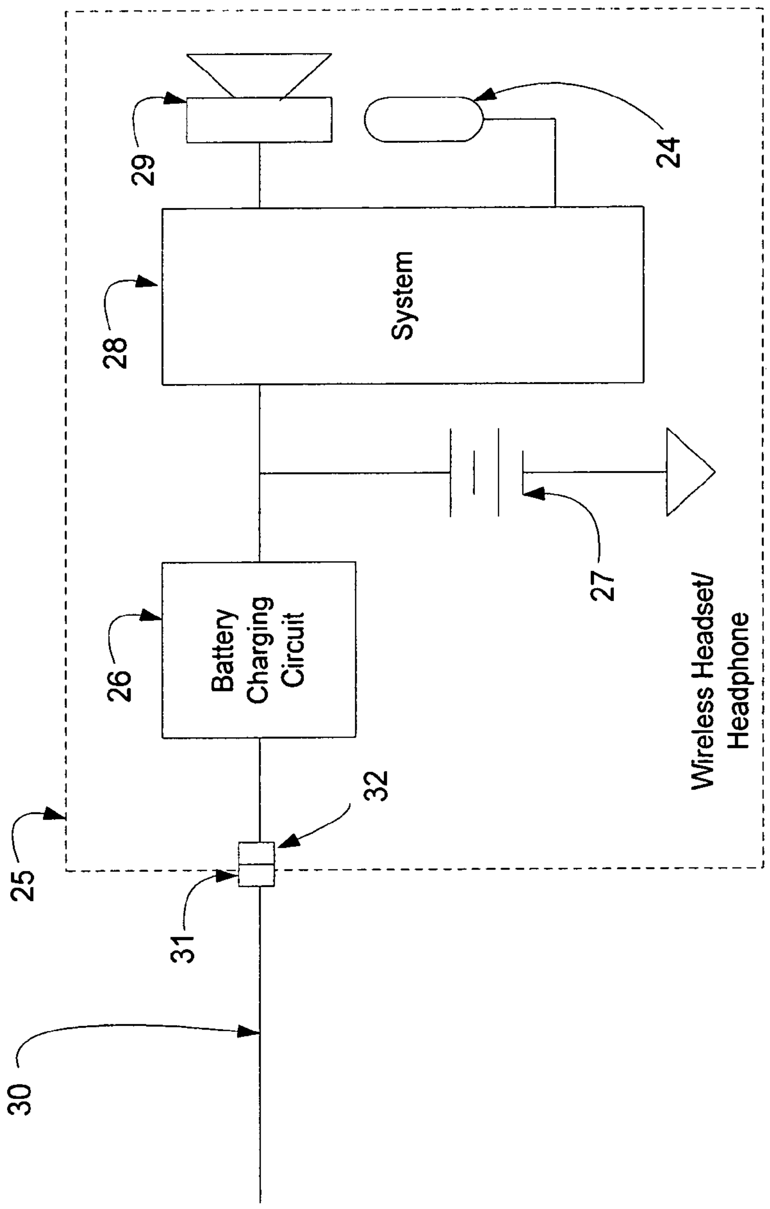
FIG. 3 (Prior Art)
FIG. 3 shows a prior art method of battery charging of a wireless headset/headphone apparatus via a wire connection.
Figure 4:
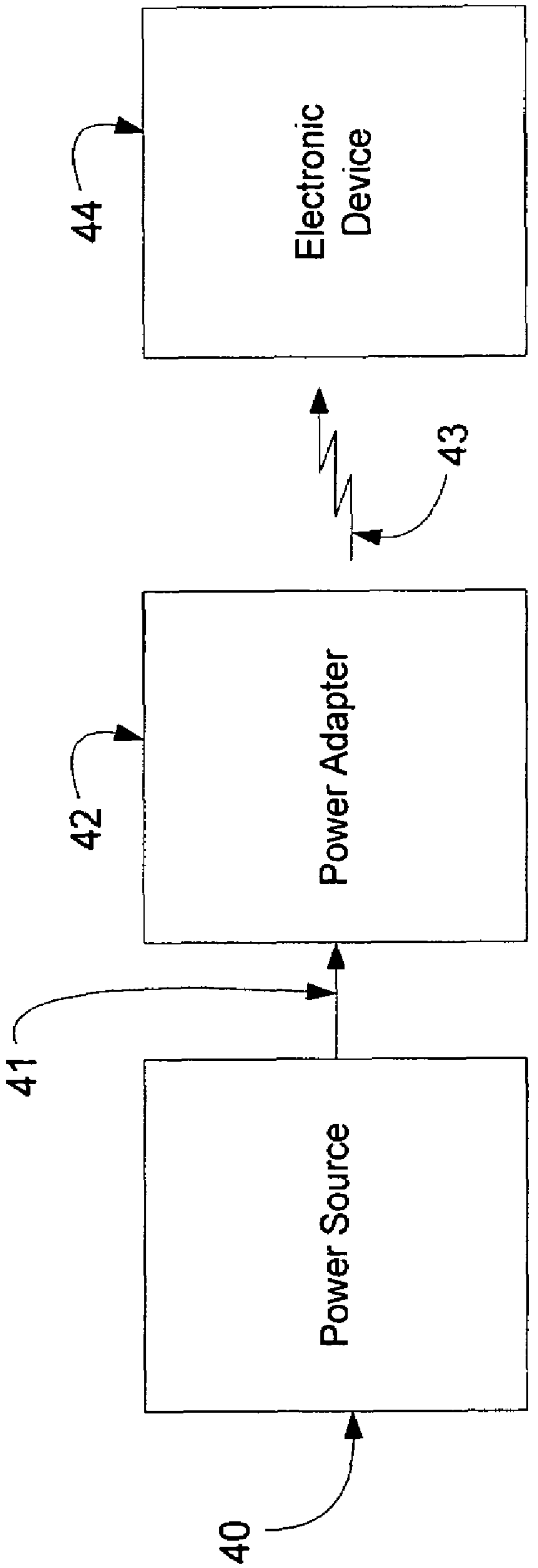
FIG. 4 (Prior Art)
FIG. 4 shows a prior art method of battery charging of an electronic device via wireless charging.
Figure 5:
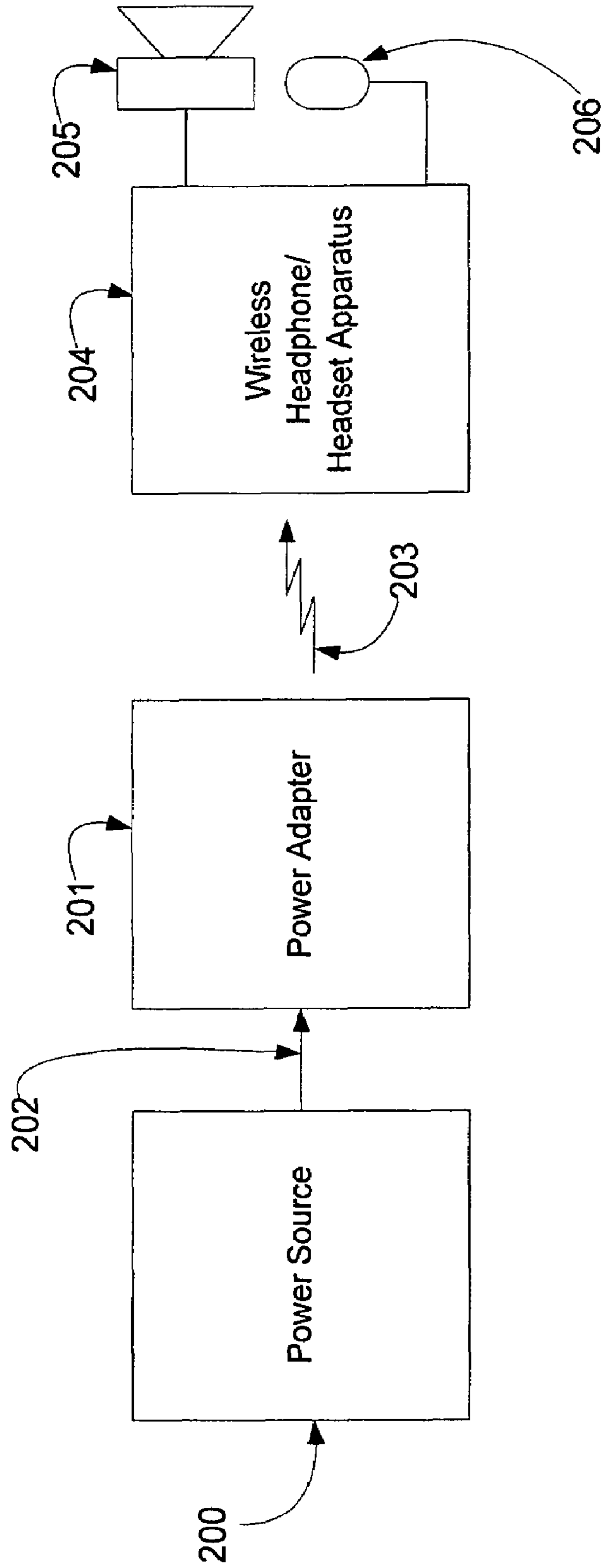
FIG. 5 is a block diagram showing wireless battery charging of a wireless headset/headphone apparatus.

FIG. 5 describes a method for wirelessly charging the battery in a wireless headphone/headset apparatus 204. The power source 200 provides energy via a conductive means 202 to a power adapter 201. The power adapter 201 provides power to the wireless headphone/headset apparatus 204 via non-conductive means 203, typically inductive coupling.

Figure 6:
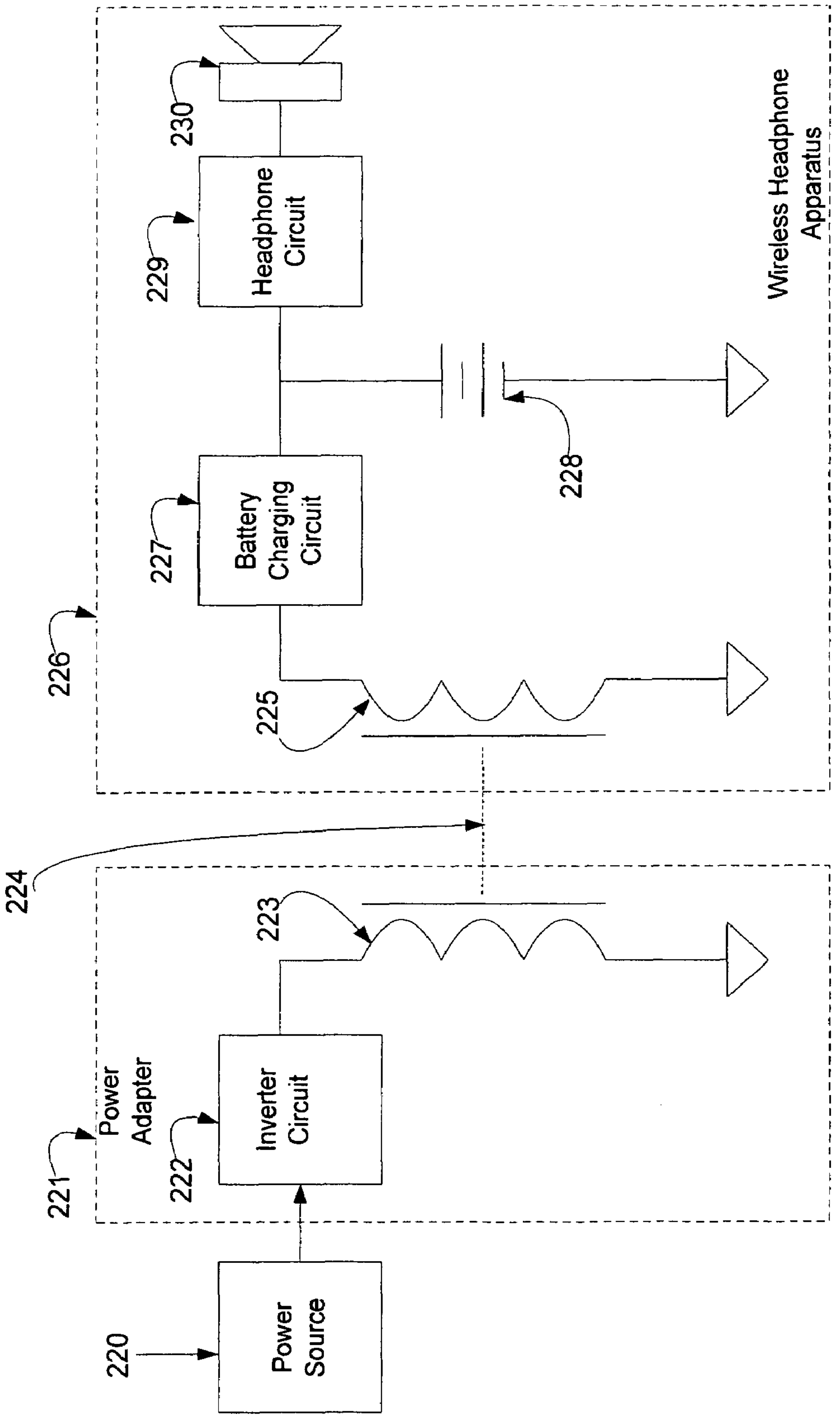
FIG. 6 is a block diagram showing wireless battery charging of a wireless headphone apparatus.

FIG. 6 describes, by way of a non-limiting example, a method for wirelessly charging the battery in a wireless headphone apparatus 226. The power source 220 provides power to a power adapter 221. An inverter circuit 222 provides AC power to the charging coil 223. Energy is transferred to the wireless headphone 226 via inductive coupling 224 to an energy collection element 225. The energy received by the energy collection element 225 is transferred via the battery charging circuit 227 to the battery 228. The battery charging circuit manages 227 the charging of battery 228. The energy stored in the battery 228 is used to power the headphone circuit 229, which provides drive signal to the transducer 230.

Figure 7:
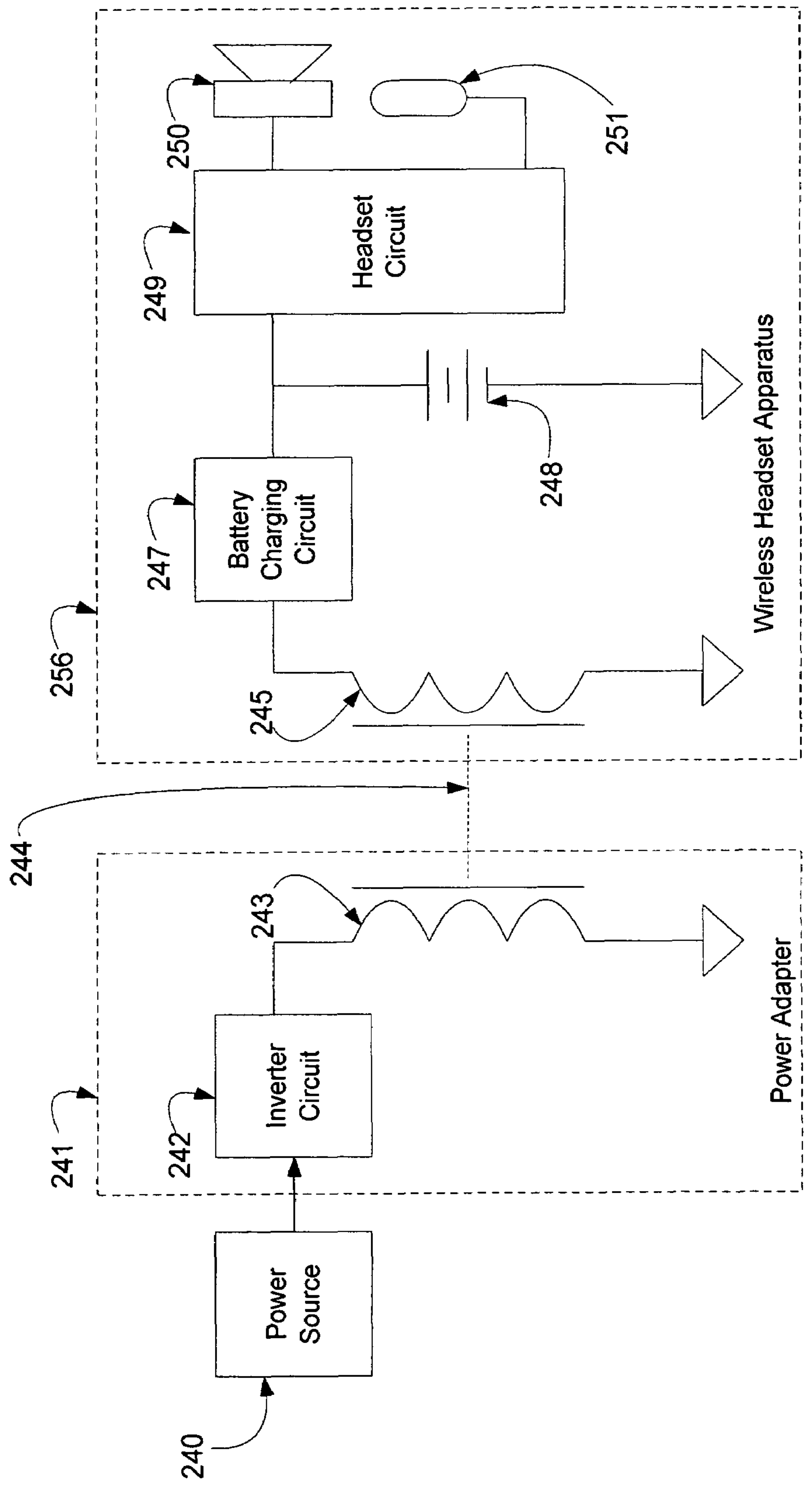
FIG. 7 is a block diagram showing wireless battery charging of a wireless headset apparatus.

FIG. 7 describes, by way of a non-limiting example, a method for wirelessly charging the battery in a wireless headset apparatus 256. The power source 240 provides power to a power adapter 241. An inverter circuit 242 provides AC power to the charging coil 243. Energy is transferred to the wireless headset 256 via inductive coupling 244 to an energy collection element 245. The energy received by the energy collection element 245 is transferred via the battery charging circuit 247 to the battery 248. The battery charging circuit 247 manages the charging of battery 248. The energy stored in the battery 248 is used to power the headset circuit 249, which provides drive signal to the transducer 230 and interfaces with the microphone 251.

Figure 8:
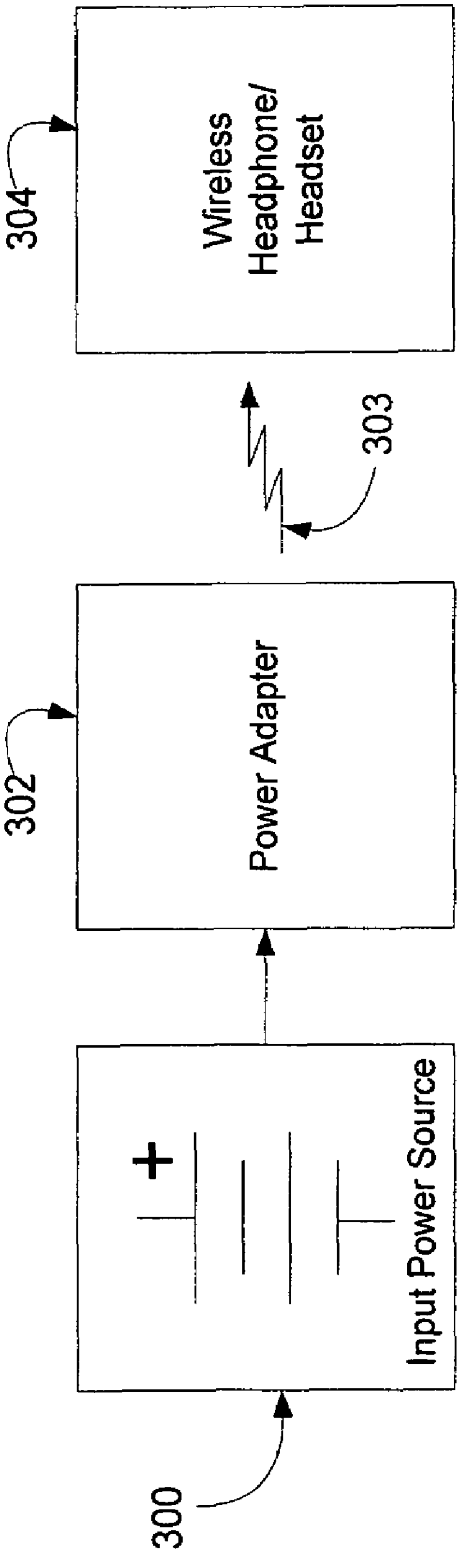
FIG. 8 is a block diagram showing wireless battery charging of a wireless headset/headphone apparatus with a DC voltage input source.

FIG. 8 describes, by way of a non-limiting example, a method for wirelessly charging the battery in a wireless headphone/headset apparatus 304. The input power source 300 is DC voltage. By way of a non-limiting example, the DC voltage is provided by Universal Serial Bus terminals. The input power source 300 provides power to the power adapter 302. Energy is transferred to the wireless headphone/headset 304 via the wireless charging magnetic field 303.

Figure 9:
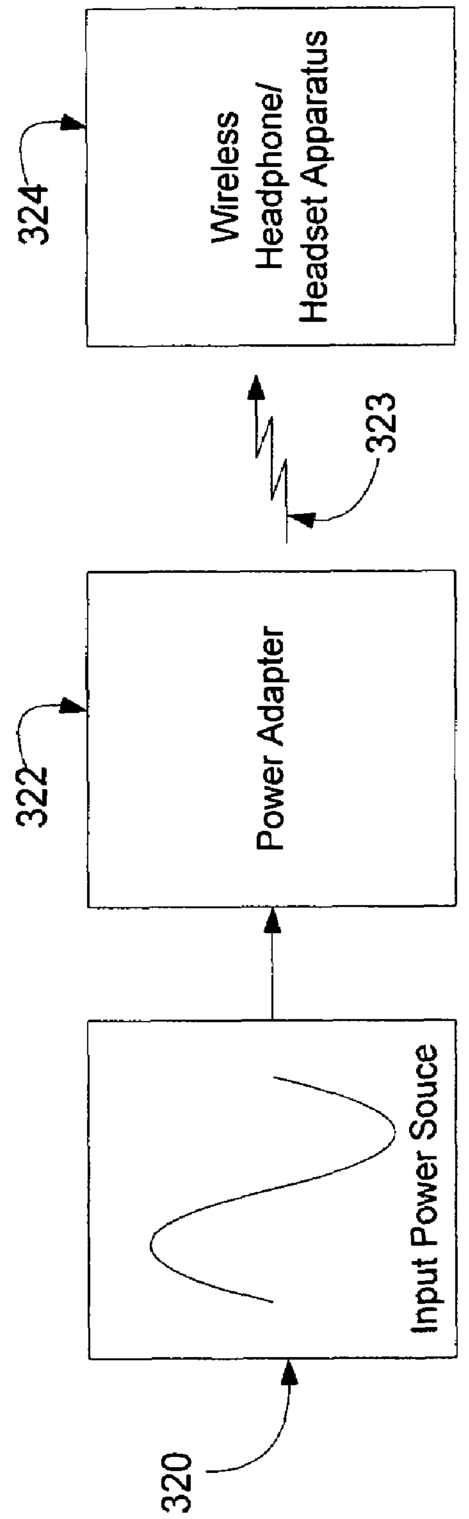
FIG. 9 is a block diagram showing wireless battery charging of a wireless headset/headphone apparatus with an AC voltage input source.

FIG. 9 describes, by way of a non-limiting example, a method for wirelessly charging the battery in a wireless headphone/headset apparatus 324. The input power source 320 is an AC line voltage. The input power source 320 provides power to the power adapter 322. Energy is transferred to the wireless headphone/headset apparatus 324 via inductive coupling 323.

Figure 10:
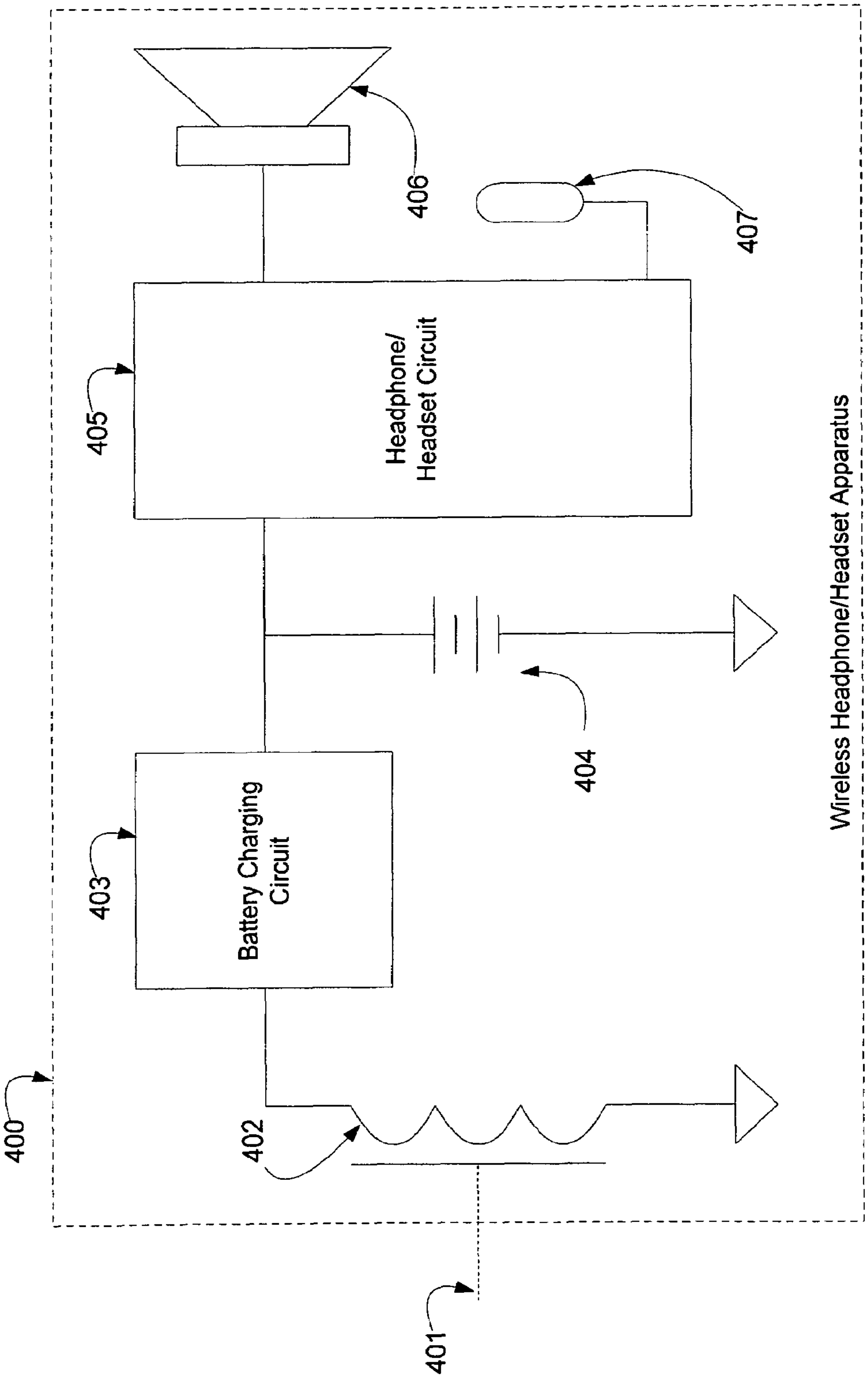
FIG. 10 is a block diagram showing wireless battery charging of a wireless headset/headphone apparatus with a secondary inductive charging element.

FIG. 10 describes, by way of a non-limiting example, a method for wirelessly charging the battery in a wireless headphone/headset apparatus 400. Energy is transferred to the wireless headphone/headset apparatus 400 via inductive coupling 401 to an energy collection element 402. The energy received by the energy collection element 402 is transferred via the battery charging circuit 403 to the battery 404. The battery charging circuit 403 manages the charging of battery 404. The energy stored in the battery 404 is used to power the headphone/headset circuit 405, which provides a drive signal to the transducer 406 and interface with the microphone 407. By way of a non-limiting example, the secondary coil 402 is a trace pattern on a printed wiring board or an inductive component.

Figure 11:
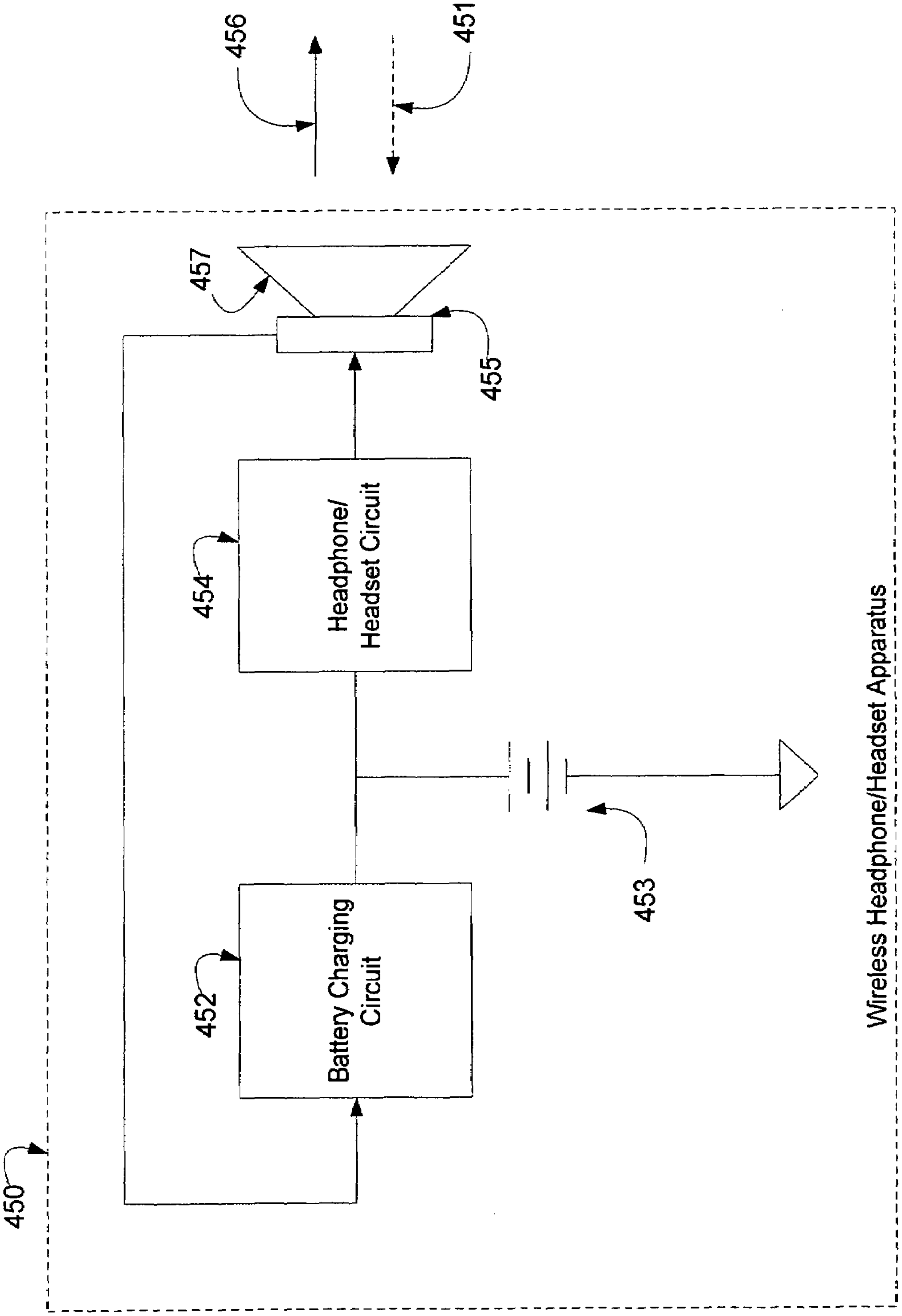
FIG. 11 is a block diagram showing wireless battery charging of a wireless headset/headphone apparatus where a coil of a transducer in the headset/headphone apparatus is also used as an energy collection element.

FIG. 11 describes, by way of a non-limiting example, a method for wirelessly charging the battery in a wireless headphone/headset apparatus 450. Energy is transferred to the wireless headphone/headset 450 via inductive coupling 451 to an energy collection element 457. The energy received by the energy collection element 457 is transferred via the battery charging circuit 452 to the battery 453. The battery charging circuit 452 manages the charging of battery 453. The energy stored in the battery 453 is used to power the headphone/headset circuit 454, which provides a drive signal to the transducer 455. By way of a non-limiting example, the energy collection element 457 is the inductive coil of the transducer 455. The transducer has a dual purpose of producing sound 456 and receiving magnetic energy via the wireless magnetic field 451.

As shown in FIG. 11 and described above, the coil of the speaker of the wireless headphone/headset apparatus 450 has a dual role. The coil causes the speaker to produce sound 456, and it also acts as an inductive energy collector by receiving energy 451 transferred to the coil via inductive coupling (i.e., the coil acts as a secondary coil to the primary coil in the power adapter). The battery charging circuit 452 recharges the battery 453 with energy transferred to the coil via inductive coupling. Additional components that can be used with such an apparatus are shown in FIG. 12 and are described below.

Figure 12:
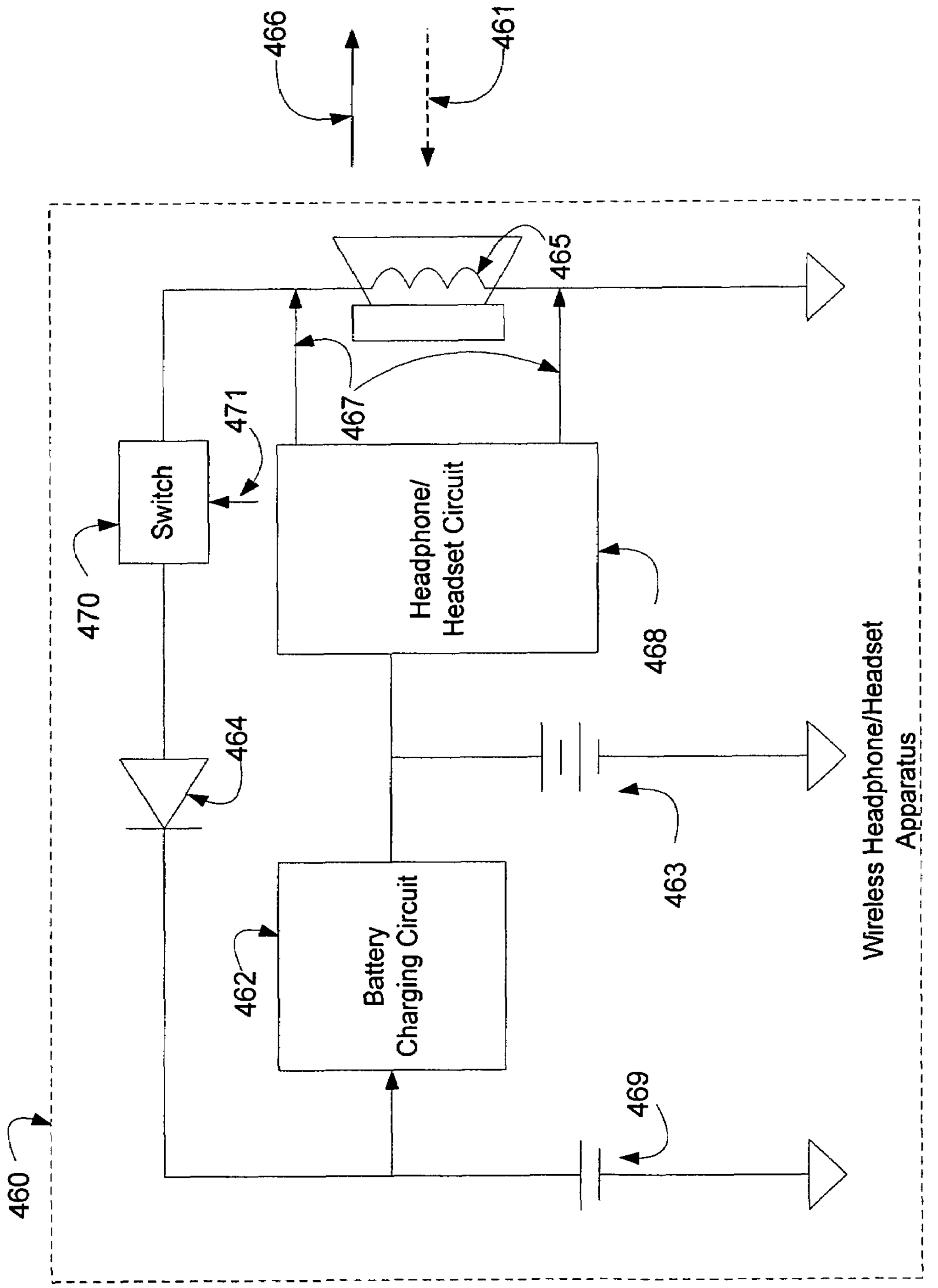
FIG. 12 is a block diagram showing wireless battery charging of a wireless headset/headphone apparatus where a coil of a transducer in the headset/headphone apparatus is also used as an energy collection elemenet.

FIG. 12 describes, by way of a non-limiting example, a method for wirelessly charging the battery in a wireless headphone/headset apparatus 460. Energy is transferred to the wireless headphone/headset apparatus 460 via inductive coupling 461 to an energy collection element 465. The energy collection element 465 has a dual role and is also used as the transducer coil of a headphone/headset/audio speaker. The energy received by the coil 465 is transferred via the battery charging circuit 462 to the battery 463. The coupled power from the coil 465 is rectified via rectifier 464, which converts the AC voltage from the coil 465 to DC voltage. The rectified voltage is filtered using an energy storage capacitor 469. The battery charging circuit 462 manages charging of the battery 463 by taking the raw energy received by the coil 465 and providing the proper voltage to the battery 463 based on its type (e.g., lithium ion versus NiCad battery). The energy stored in the battery 463 is used to power the headphone/ headset circuit 468. In one embodiment, the headphone/headset circuit 468 includes an RF receiver (or transceiver) to receive an incoming RF signal via an antenna (not shown), a signal processor to demodulate the signal, a CODEC to decompress the signal (if the signal is compressed), and a power amplifier circuit to provide a drive signal 467 to the speaker coil 465. If the apparatus 460 is a headset, the headphone/headset circuit 468 can also include an analog-to-digital converter, a voice processor, and an RF transceiver. Of course, the headphone/headset circuit 468 can include additional or different functionality.

The wireless headphone/headset apparatus 460 in this embodiment also comprises a switch 470 controlled by a switch control signal 471. The switch control signal 471 causes the switch 470 to close when in charging mode and to open when in non-charging mode. When the switch 470 is open (in non-charging mode), the coil 465 is isolated from the battery charging circuit 462, the rectifier 464, and the energy storage capacitor 469. Disconnecting these components reduces the load on the coil 465 and eliminates audio distortion caused by these component (e.g., when a stray magnetic field causes the coil 465 to deliver energy to these components). When the switch 470 is closed (in charging mode), the coil 465 is in communication with the battery charging circuit 462 and other components, and energy received by the coil 465 is used to re-charge the battery 463. The switch 470 can take any suitable form, including, but not limited to, a solid state switch (such as a MOSFET), an electromechanical switch (such as a relay device), or a mechanical switch selectable by a user. Preferably, the switch 470 can sense when the headphone/headset apparatus 460 is near the power adapter, so that it automatically closes to the charge position when near the power adapter and automatically opens to the non-charge position when away from the power adapter. Alternatively, as described below, the power adapter can be operative to wirelessly communicate with the headphone/headset apparatus. In this way, the power adapter can wirelessly transmit the switch control signal 471 to the headphone/headset apparatus 460 to cause the switch 470 to close when the headphone/headset apparatus 460 is near the adapter.

Figure 13:
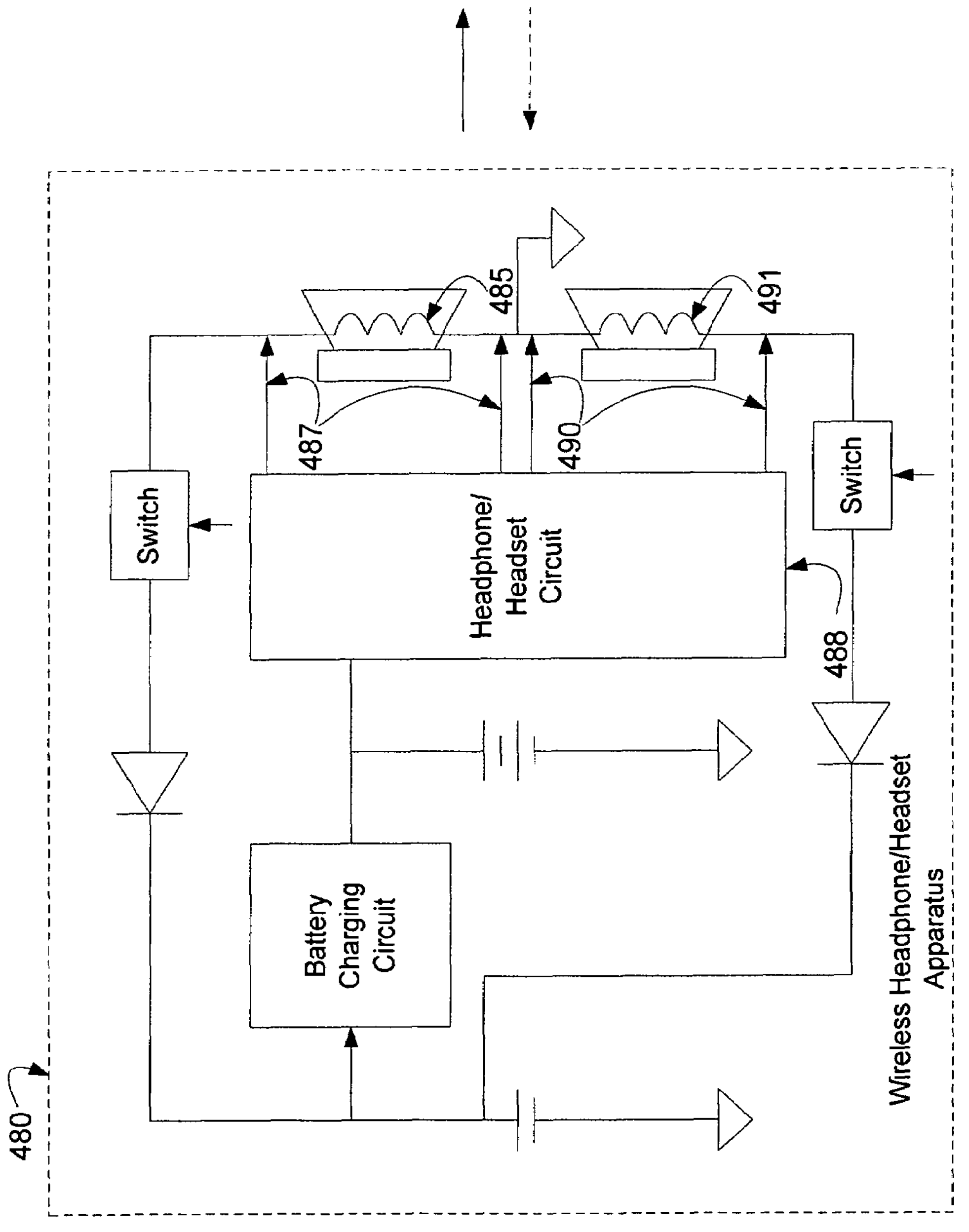
FIG. 13 is a block diagram showing wireless battery charging of a wireless headset/headphone apparatus where coils of transducers in the headset/headphone apparatus are also used as energy collection elements.

A headphone/headset apparatus can include one speaker, such as a single earbud, which has a single speaker. FIG. 12 is an example of the use of a headphone/headset apparatus with one speaker. To provide both left and right audio (including stereo), two such headset apparatuses would be used—one for the left ear and one for the right ear. However, a headphone/headset apparatus can also include more than one speaker, such as a pair of headphones containing a left speaker and a right speaker. In such a situation, the coil from one or both speakers can provide the dual role of causing its speaker to produce sound and to collect inductive energy. For example, FIG. 13 shows a wireless headphone/headset apparatus 480 with a headphone/headset circuit 488 capable of providing audio drive signals 487, 490 for two coils 485, 491 of two speakers.

Figure 14:
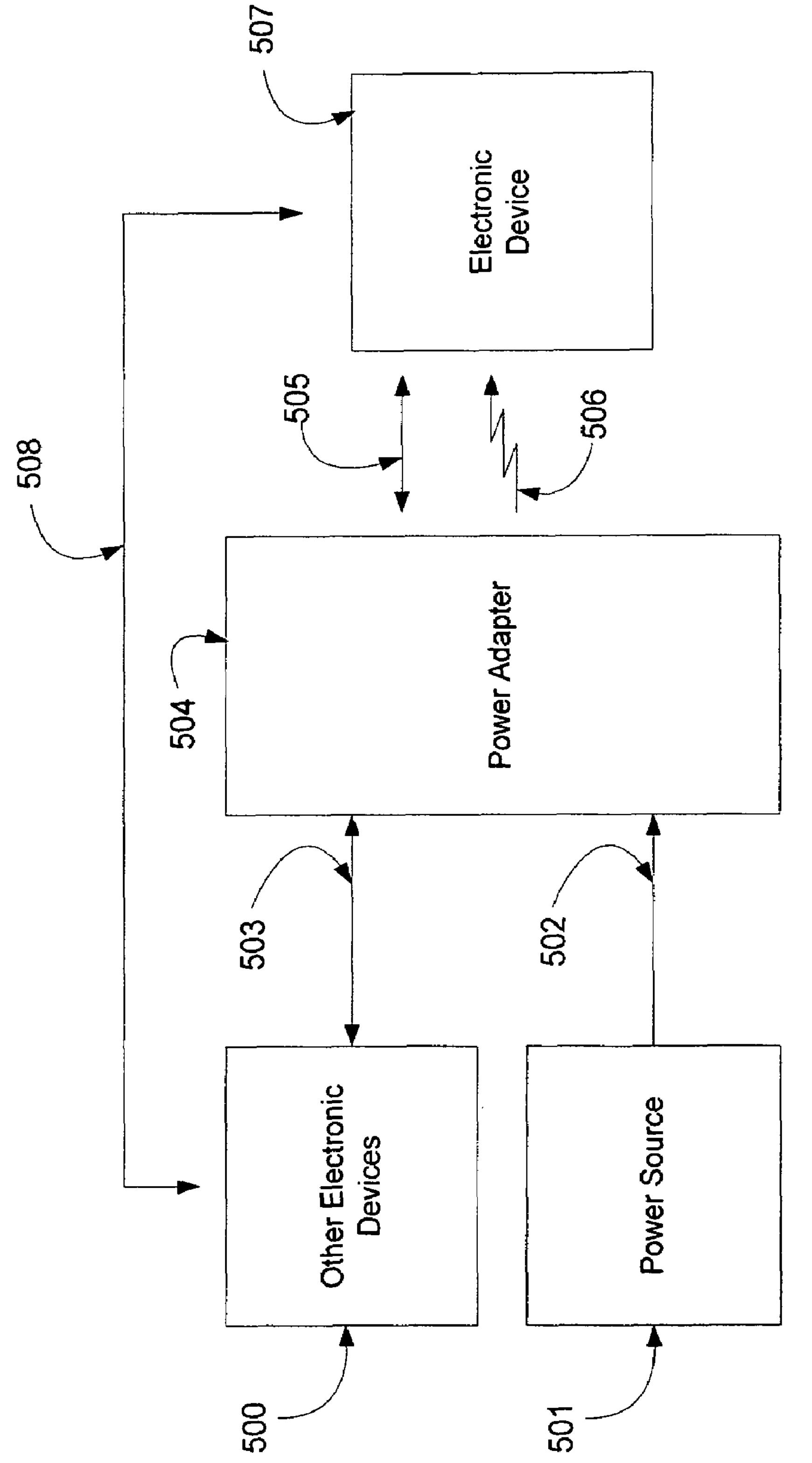
FIG. 14 is a block diagram showing wireless battery charging of an electronic device with additional data communication capabilities.

FIG. 14 describes, by way of a non-limiting example, a wireless battery charging method of any electronic device 507. Energy from the power source 501 is provided to the power adapter 504. Energy is transferred to the electronic device 507 via inductive coupling 506. There is a wireless data communication channel 505 between the electronic device 507 and the power adapter 504. There is a wireless data communication channel 508 between the electronic device 507 and other electronic devices 500. There is a data communication channel 503 between the power adapter 504 and other electronic devices 500. By way of non-limiting examples, the data communication channels 503, 505, 508 can be used to upgrade software, provide control signals, transfer data files, provide battery charging status, provide means of association between various electronic devices, and provide diagnostic data.

Figure 15:
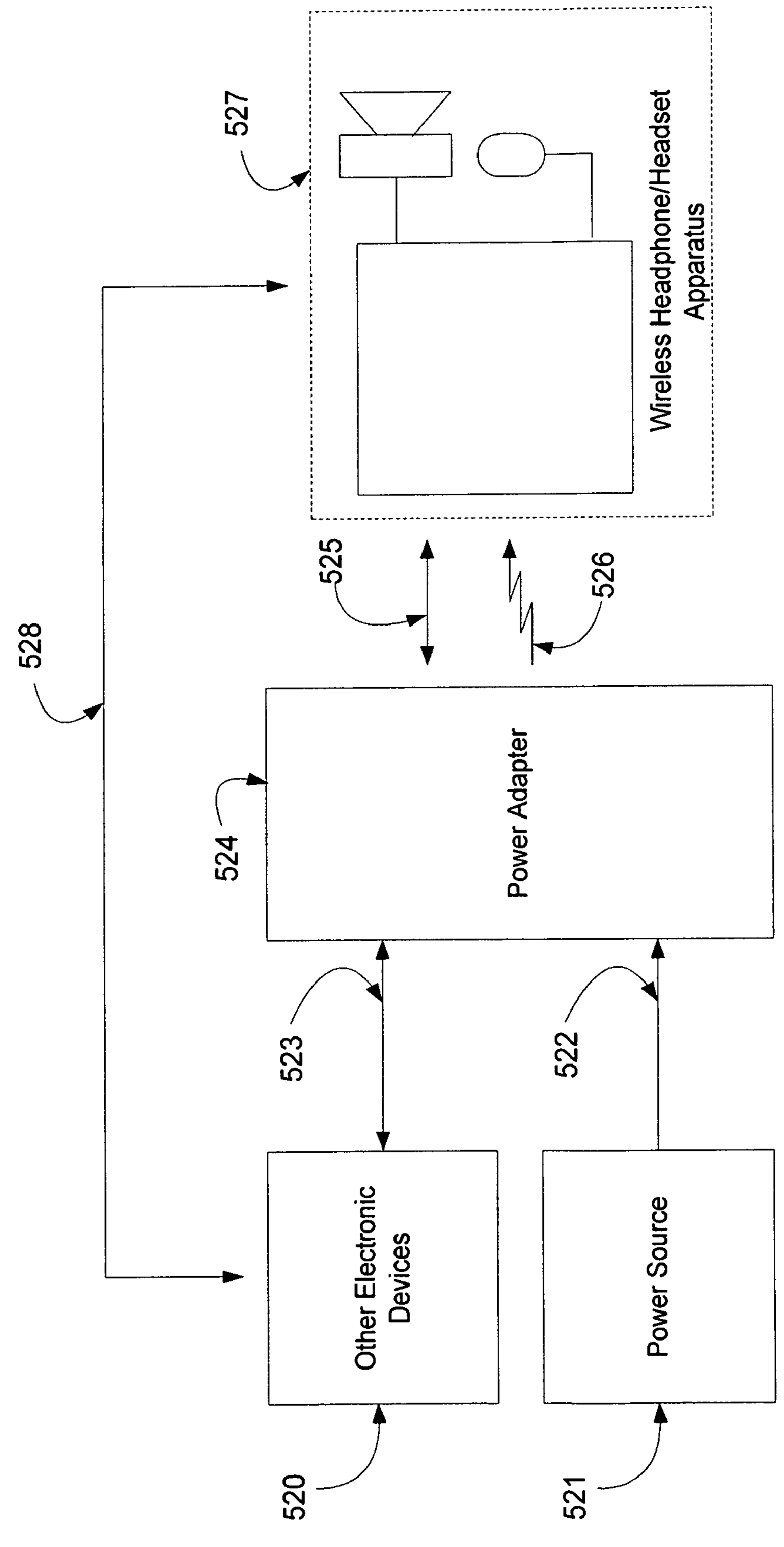
FIG. 15 is a block diagram showing wireless battery charging of a wireless headphone/headset apparatus with additional data communication capabilities.

FIG. 15 describes, by way of a non-limiting example, a method for wirelessly charging the battery in a wireless headphone/headset apparatus 527. Energy from the power source 521 is provided to the power adapter 524. Energy is transferred to the wireless headphone/headset apparatus 527 via inductive coupling 526. There is a wireless data communication channel 525 between the wireless headphone/headset 527 and the power adapter 524. There is a wireless data communication channel 528 between the wireless headphone/headset apparatus 527 and other electronic devices 520. There is a data communication channel 523 between the power adapter 524 and other electronic devices 520. By way of non-limiting examples, the data communication channels 523, 525, 528 can be used to upgrade software, provide control signals, transfer data files, provide battery charging status, provide means of association between various electronic devices, and provide diagnostic data.

Figure 16:
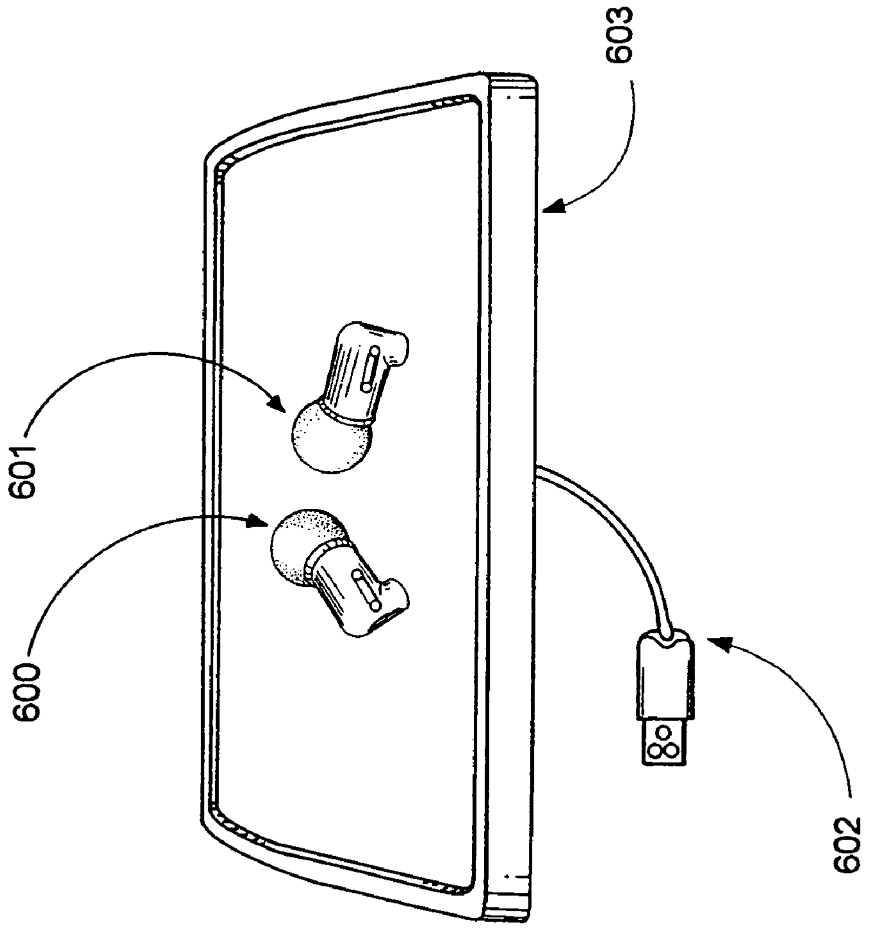
FIG. 16 is a block diagram showing wireless battery charging of a headset/headphone apparatus where a power adapter provides a platform for the headset/headphone apparatus.

FIG. 16 describes, by way of a non-limiting example, a method for wirelessly charging the battery in a wireless headphone/headset apparatus 600, 601. As shown in FIG. 15, wireless headphones can take the form of earbuds. Power adapter 603 provides energy through a wireless means to headphone/headset apparatus 600, 601. Power adapter 603 provides a platform to set the headphone/headset apparatus 600, 601 while charging. Input power is provided via connector 602.

Figure 17:
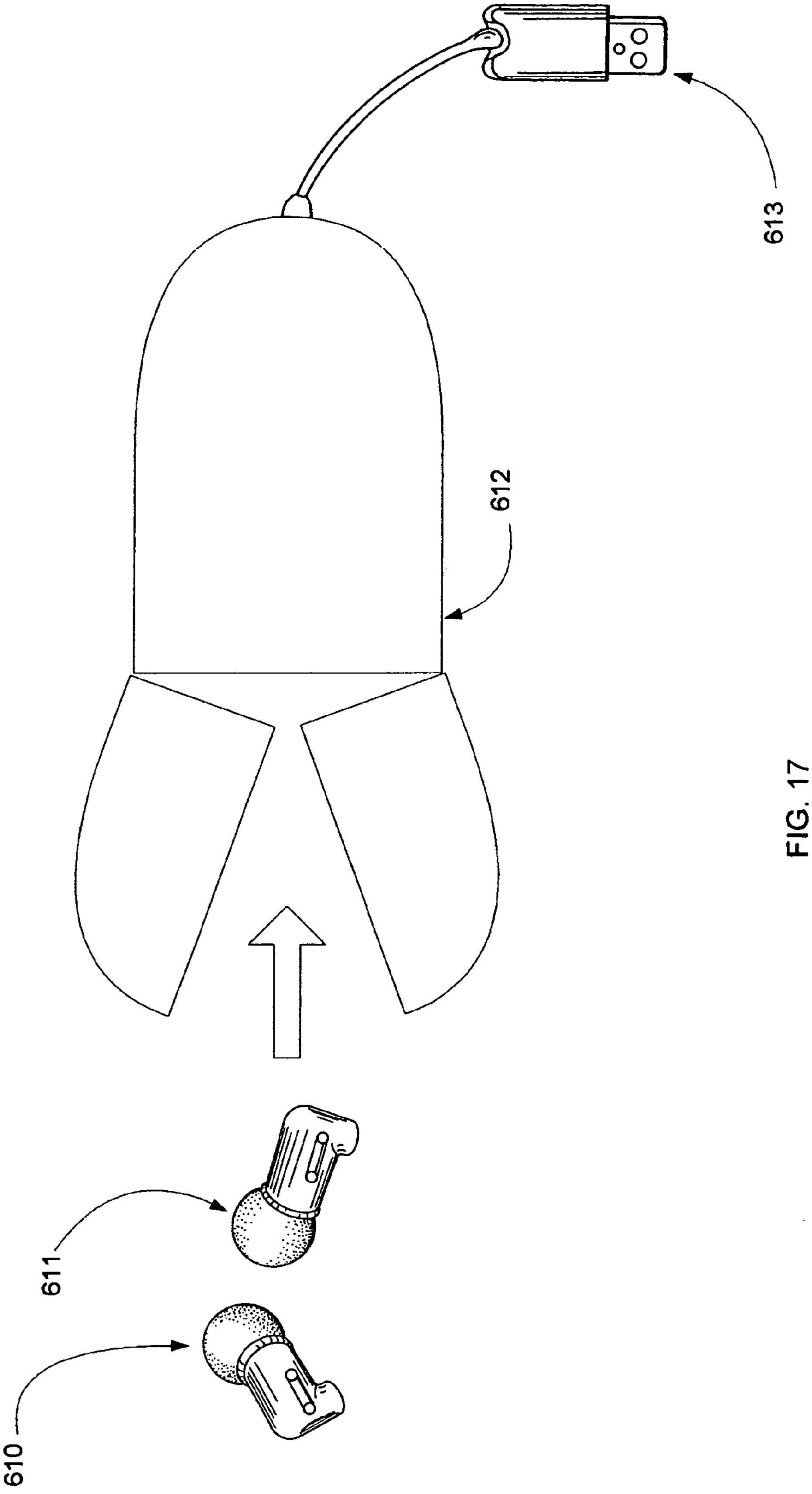
FIG. 17 is a block diagram showing wireless battery charging of a headset/headphone apparatus where a power adapter also provides a protective cavity for the headset/headphone apparatus.

FIG. 17 describes, by way of a non-limiting example, a method for wirelessly charging the battery in a wireless headphone/headset apparatus 610, 611. Power adapter 612 provides energy through a wireless means to the headphone/headset apparatus 610, 611. Power adapter 612 provides charging, physical protection, and storage of the headphone/headset apparatus 610, 611. Input power is provided via connector 612.

Figure 18:
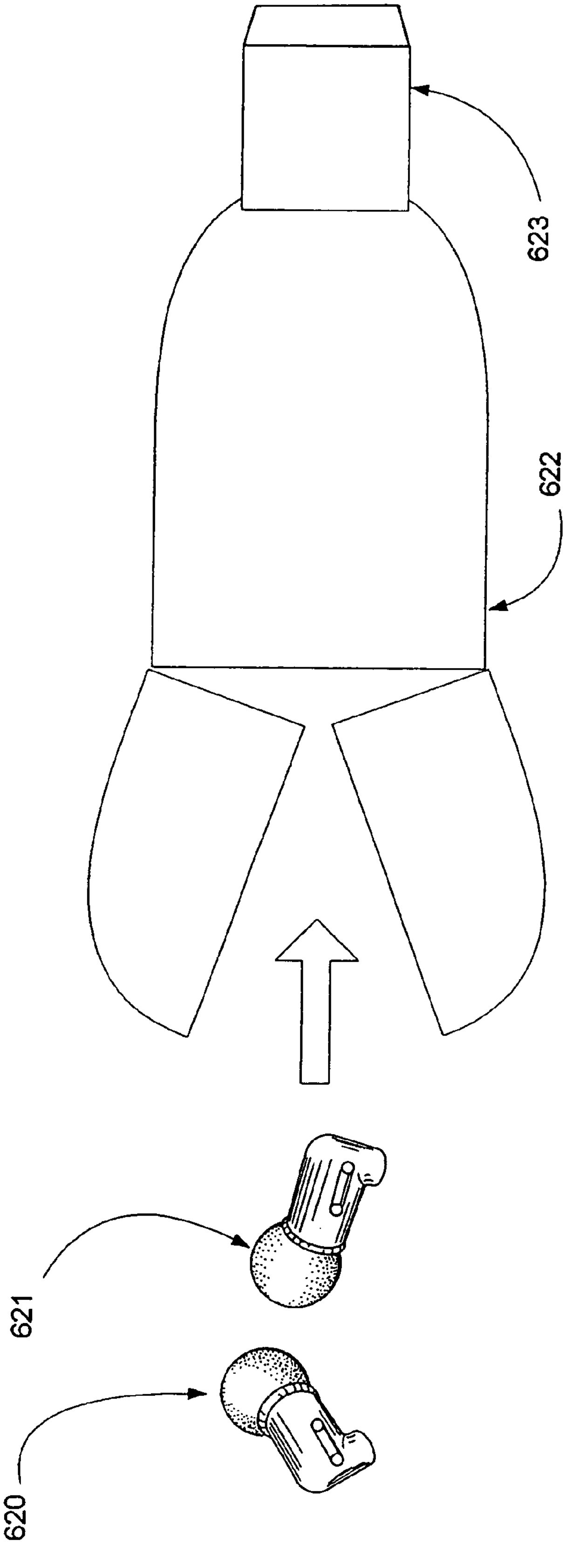
FIG. 18 is a block diagram showing wireless battery charging of a headset/headphone apparatus where a power adapter also provides a protective cavity for the headset/headphone apparatus and has a rigid connector used for power and data communication.

FIG. 18 describes, by way of a non-limiting example, a method for wirelessly charging the battery in a wireless headphone/headset apparatus 620, 621. Power adapter 622 provides energy through a wireless means to the headphone/headset apparatus 620, 621. Power adapter 622 provides charging, physical protection, and storage of the headphone/headset apparatus 620, 621. Input power is provided via connector 623.

Figure 19:
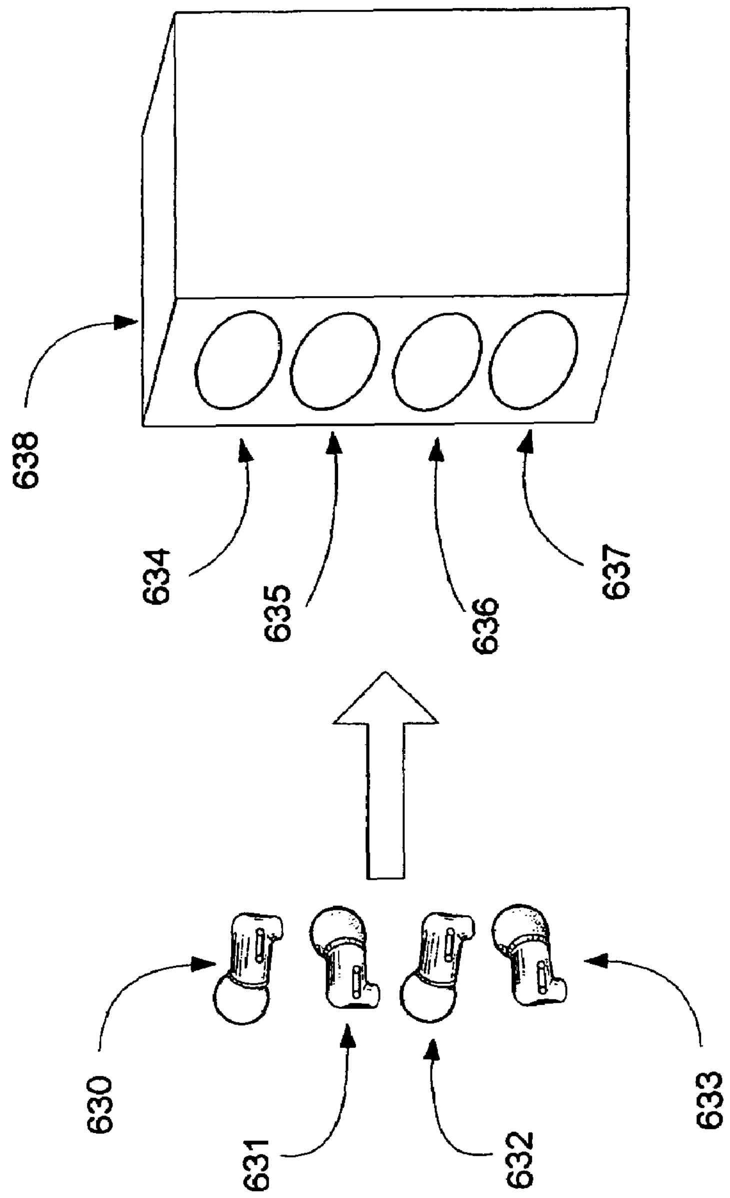
FIG. 19 is a block diagram showing wireless battery charging of a headset/headphone apparatus where a power adapter for a headset/headphone apparatus provides optimum inductive coupling to maximize charging.

FIG. 19 describes, by way of a non-limiting example, a method for wirelessly charging the battery in a wireless headphone/headset apparatus 630, 631, 632, 633. The mechanical and electrical design of the power adapter 638 optimizes inductive coupling between the charging coil 223 in FIG. 6, and the energy collection element 225 in FIG. 6. This would include mechanical orientation and electrical housing to insure maximum coupling and effective battery charging.

Figure 20:
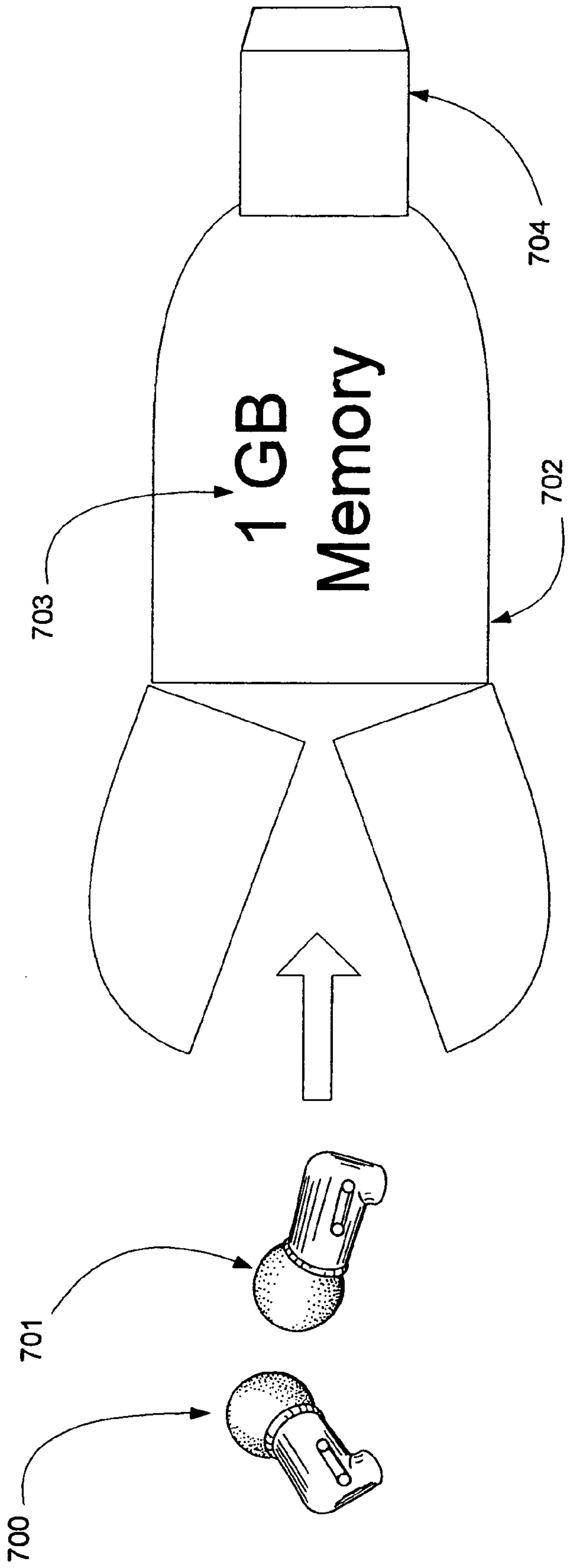
FIG. 20 is a block diagram showing wireless battery charging of a headset/headphone apparatus where a power adapter has an integrated memory card device.

FIG. 20 describes, by way of a non-limiting example, a method for wirelessly charging the battery in a wireless headphone/headset apparatus 700, 701. Power adapter 702 provides energy through a wireless means to the headphone/headset apparatus 700, 701. Power adapter 702 provides charging, physical protection, and storage of the headphone/headset apparatus 700, 701. Input power is provided via connector 704. The power adapter 702 can also be used as a portable memory device 703 as it has embedded control and memory elements.

Figure 21:
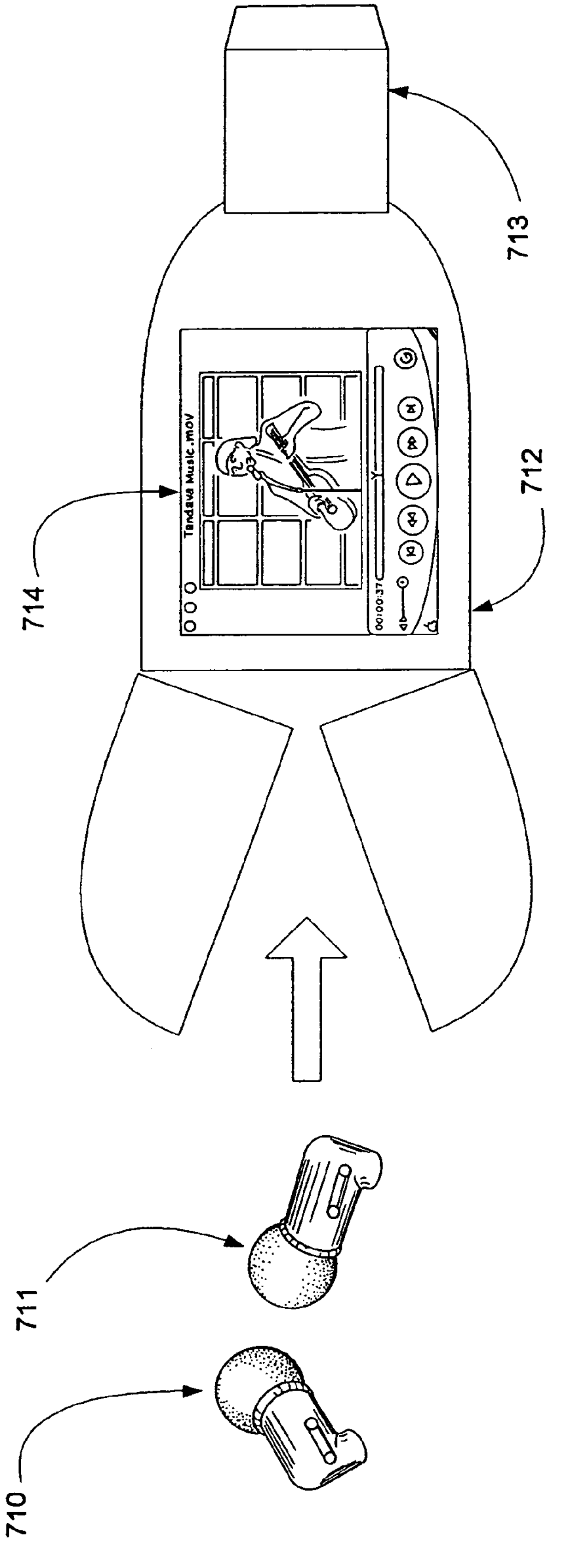
FIG. 21 is a block diagram showing wireless battery charging of a headset/headphone apparatus where a power adapter has an integrated video player.

FIG. 21 describes, by way of a non-limiting example, a method for wirelessly charging the battery in a wireless headphone/headset apparatus 710, 711. Power adapter 712 provides energy through a wireless means to the headphone/headset apparatus 710, 711. Power adapter 712 provides charging, physical protection, and storage of the headphone/headset apparatus 710, 711. Input power is provided via connector 713. The power adapter 712 contains an embedded video player 714 as it has embedded control, display, and memory elements.

Figure 22:
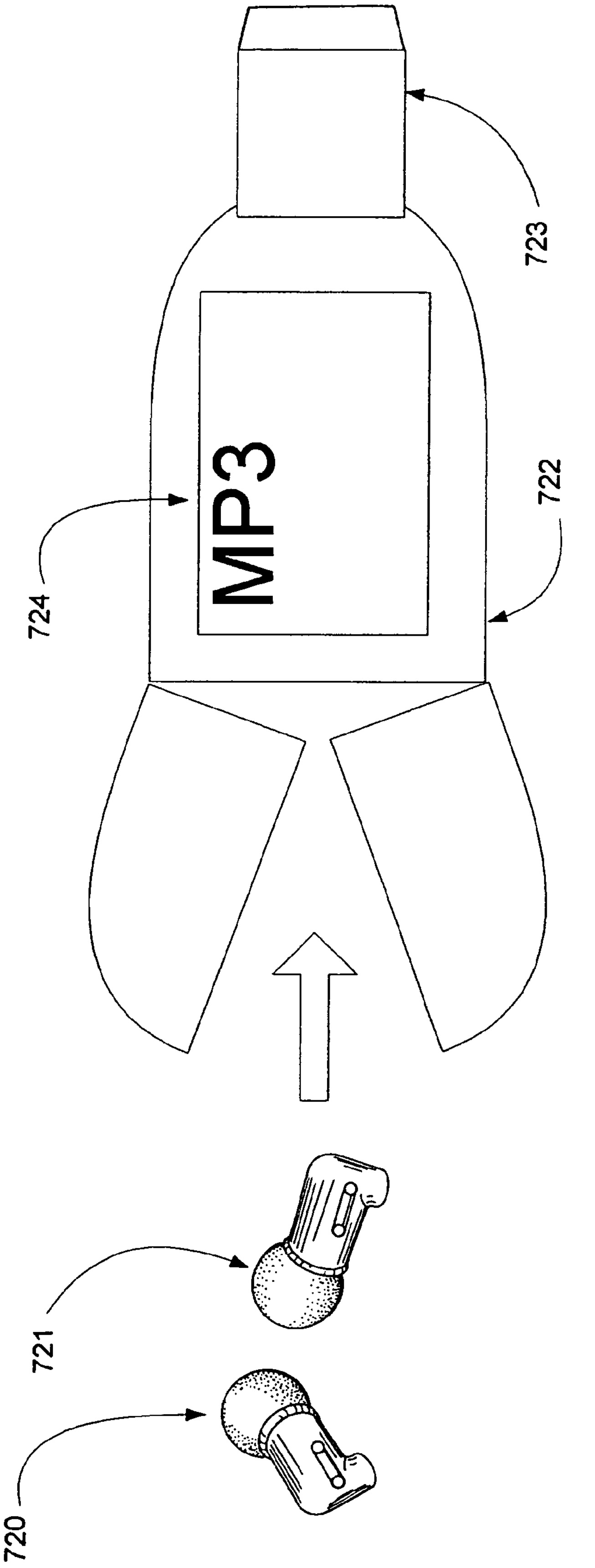
FIG. 22 is a block diagram showing wireless battery charging of a headset/headphone apparatus where a power adapter has an integrated music/audio player.

FIG. 22 describes, by way of a non-limiting example, a method for wirelessly charging the battery in a wireless headphone/headset apparatus 720, 721. Power adapter 722 provides energy through a wireless means to the headphone/headset apparatus 720, 721. Power adapter 722 provides charging, physical protection, and storage of the headphone/headset apparatus 720, 721. Input power is provided via connector 723. The power adapter 722 has an embedded audio device 724 as it has embedded control and memory elements.

Figure 23:
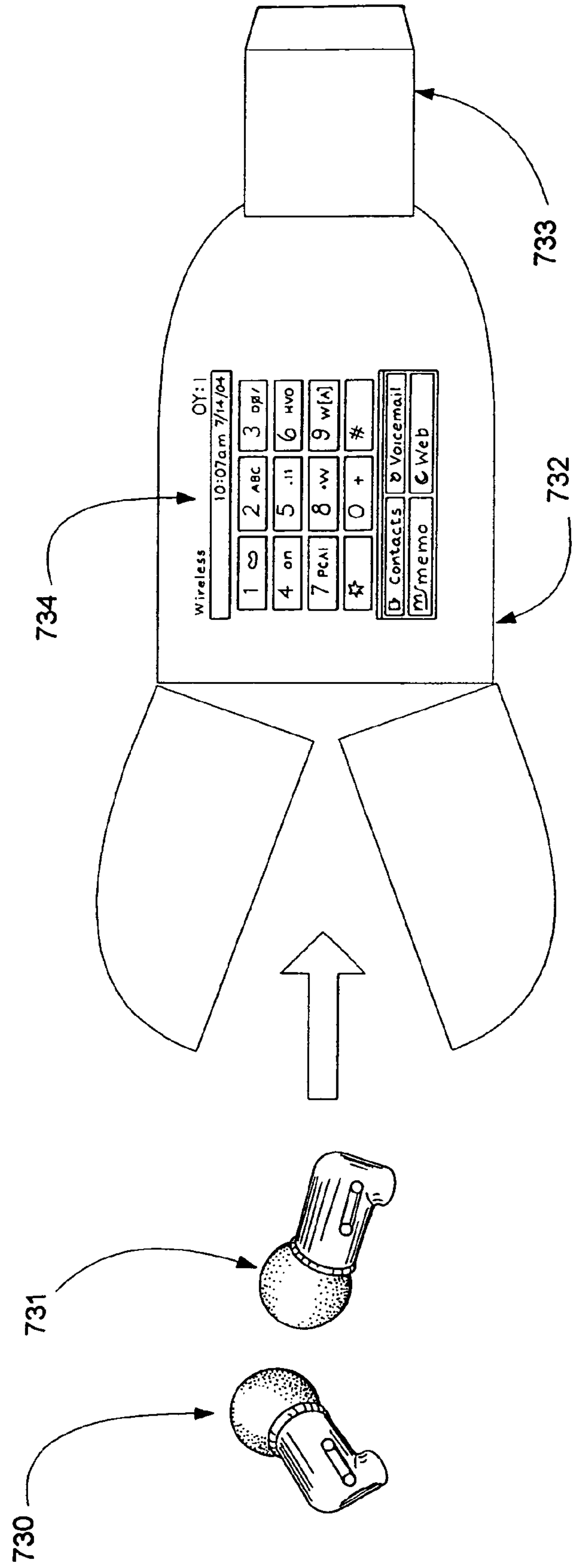
FIG. 23 is a block diagram showing wireless battery charging of a headset/headphone apparatus where a power adapter has an integrated cellular phone.

FIG. 23 describes, by way of a non-limiting example, a method for wirelessly charging the battery in a wireless headphone/headset apparatus 730, 731. Power adapter 732 provides energy through a wireless means to the headphone/headset apparatus 730, 731. Power adapter 732 provides charging, physical protection, and storage of the headphone/headset apparatus 730, 731. Input power is provided via connector 733. The power adapter 732 has an embedded cellular phone 734 as it has embedded control, display, and memory elements.

Figure 24:
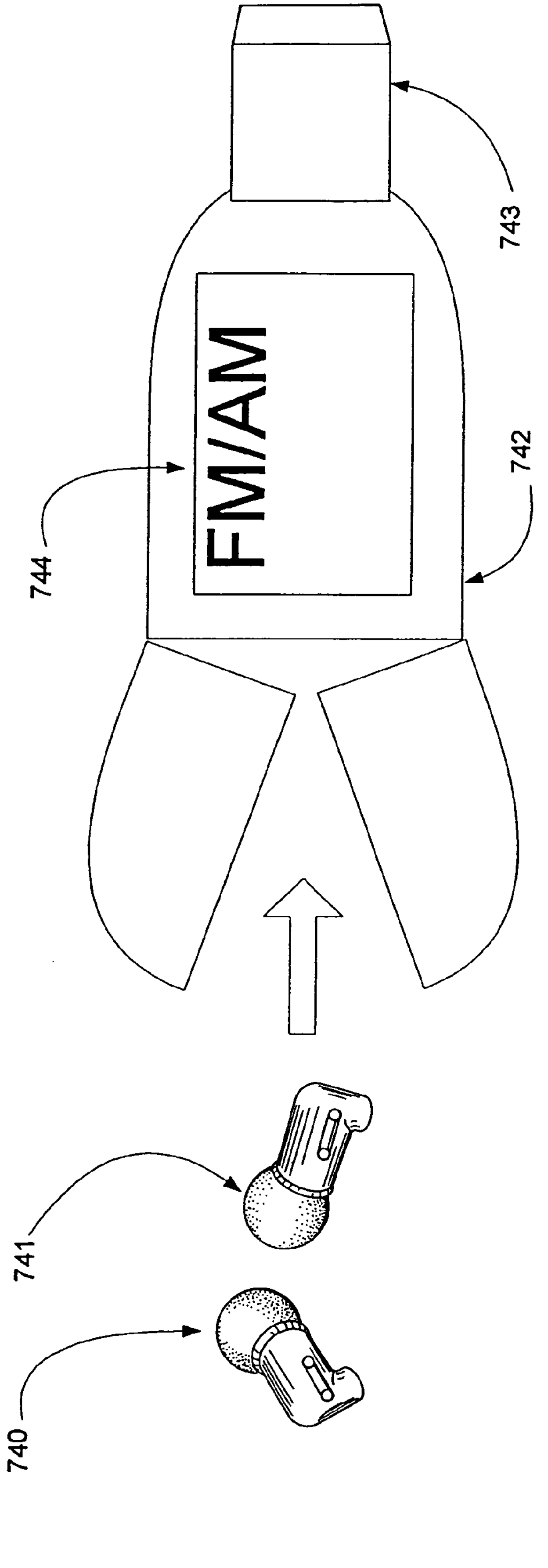
FIG. 24 is a block diagram showing wireless battery charging of a headset/headphone apparatus where a power adapter has an integrated radio.

FIG. 24 describes, by way of a non-limiting example, a method for wirelessly charging the battery in a wireless headphone/headset apparatus 740, 741. Power adapter 742 provides energy through a wireless means to the headphone/headset apparatus 740, 741. Power adapter 742 provides charging, physical protection, and storage of the headphone/headset apparatus 740, 741. Input power is provided via connector 743. The power adapter 732 has an embedded audio radio 744 as it has embedded control, display, and memory elements.

While many of these embodiments have been discussed in conjunction with a wireless headphone/headset apparatus, the above description makes clear that the charging techniques discussed herein can be used with any suitable electronic device. As mentioned above, electronic devices include, but are not limited to, cellular phones, portable DVD players, MP3 players, and portable computing devices, in addition to headphone/headset apparatuses.

It is intended that the foregoing detailed description be understood as an illustration of selected forms that the invention can take and not as a definition of the invention. It is only the following claims, including all equivalents, that are intended to define the scope of this invention.

What is claimed is:

1. An electronic device comprising:

a rechargeable battery;

a speaker comprising a coil, wherein the coil is operative both to cause the speaker to produce sound and to receive energy transferred to the coil via inductive coupling; and a battery charging circuit in communication with the coil such that energy transferred to the coil via inductive coupling is provided to the battery charging circuit, wherein the battery charging circuit is in communication with the rechargeable battery and is operative to recharge the rechargeable battery with energy transferred to the coil via inductive coupling.

2. The electronic device of claim 1, wherein the electronic device comprises a headphone.

3. The electronic device of claim 2, wherein the headphone comprises an earbud.

4. The electronic device of claim 1, wherein the electronic device comprises a headset.

5. The electronic device of claim 1, wherein the electronic device is selected from the group consisting of a cellular phone, a portable DVD player, an MP3 player, and a portable computing device.

6. The electronic device of claim 1 further comprising a switch positioned between the coil and the battery charging circuit, the switch operable to selectively (i) put the coil in communication with the battery charging circuit and (ii) isolate the coil from the battery charging circuit.

7. The electronic device of claim 6, wherein the switch is operative to automatically put the coil in communication with the battery charging circuit when the electronic device is near a power adapter and automatically isolate the coil from the battery charging circuit when the electronic device is away from a power adapter.

8. A headset apparatus comprising:

a rechargeable battery;

a microphone;

a speaker comprising a coil, wherein the coil is operative both to cause the speaker to produce sound and to receive energy transferred to the coil via inductive coupling; and a battery charging circuit in communication with the coil such that energy transferred to the coil via inductive coupling is provided to the battery charging circuit, wherein the battery charging circuit is in communication with the rechargeable battery and is operative to recharge the rechargeable battery with energy transferred to the coil via inductive coupling.

9. The headset apparatus of claim 8 further comprising a switch positioned between the coil and the battery charging circuit, the switch operable to selectively (i) put the coil in communication with the battery charging circuit and (ii) isolate the coil from the battery charging circuit.

10. The headset apparatus of claim 9, wherein the switch is operative to automatically put the coil in communication with the battery charging circuit when the headset apparatus is near a power adapter and automatically isolate the coil from the battery charging circuit when the headset apparatus is away from a power adapter.

11. A system comprising:

an electronic device comprising:

a rechargeable battery;

a speaker comprising a first coil, wherein the first coil is operative both to cause the speaker to produce sound and to receive energy transferred to the first coil via inductive coupling; and a battery charging circuit in communication with the first coil such that energy transferred to the first coil via inductive coupling is provided to the battery charging circuit, wherein the battery charging circuit is in communication with the rechargeable battery and is operative to recharge the rechargeable battery with energy transferred to the first coil via inductive coupling; and a power adapter comprising a second coil and operative to transfer energy to the first coil via inductive coupling.

12. The system of claim 11, wherein the electronic device comprises a headphone.

13. The system of claim 12, wherein the headphone comprises an earbud.

14. The system of claim 11, wherein the electronic device comprises a headset.

15. The system of claim 11, wherein the electronic device is selected from the group consisting of a cellular phone, a portable DVD player, an MP3 player, and a portable computing device.

16. The system of claim 11 further comprising a switch positioned between the first coil and the battery charging circuit, the switch operable to selectively (i) put the first coil in communication with the battery charging circuit and (ii) isolate the first coil from the battery charging circuit.

17. The system of claim 16, wherein the power adapter is operative to wirelessly provide a switch control signal to control whether the switch (i) puts the first coil in communication with the battery charging circuit or (ii) isolates the first coil from the battery charging circuit.

18. The system of claim 11, wherein the adapter and the electronic device are operative to establish a wireless data communication channel between with each other.

* * * * *